(12) United States Patent
Jubert et al.

(10) Patent No.: US 10,796,719 B1
(45) Date of Patent: Oct. 6, 2020

(54) HEAT-ASSISTED MAGNETIC RECORDING (HAMR) MEDIUM WITH MULTILAYERED OVERCOAT

(71) Applicant: Western Digital Technologies, Inc., San Jose, CA (US)

(72) Inventors: Pierre-Olivier Jubert, San Jose, CA (US); Paul Christopher Dorsey, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 316 days.

(21) Appl. No.: 15/913,042

(22) Filed: Mar. 6, 2018

(51) Int. Cl.
  *G11B 5/65* (2006.01)
  *G11B 5/725* (2006.01)

(52) U.S. Cl.
  CPC .............. *G11B 5/725* (2013.01); *G11B 5/653* (2013.01); *G11B 5/656* (2013.01)

(58) Field of Classification Search
  CPC ... G11B 2005/0021; G11B 5/72; G11B 5/725; G11B 5/66; G11B 5/653; G11B 5/656
  See application file for complete search history.

(56) References Cited

U.S. PATENT DOCUMENTS

| | | | |
|---|---|---|---|
| 8,760,980 B2 | 6/2014 | Zhang et al. | |
| 8,773,959 B2* | 7/2014 | Gao | G11B 5/314 369/112.27 |
| 8,848,307 B2 | 9/2014 | Seigler et al. | |
| 9,183,867 B1 | 11/2015 | Bertero et al. | |
| 9,443,544 B1 | 9/2016 | Peng et al. | |
| 9,443,545 B2* | 9/2016 | Mosendz | G11B 5/7325 |
| 9,558,777 B2 | 1/2017 | Hellwig et al. | |
| 2009/0316289 A1 | 12/2009 | Okura | |
| 2014/0140180 A1 | 5/2014 | Zhang et al. | |

(Continued)

FOREIGN PATENT DOCUMENTS

WO    2015122847 A1    8/2015

OTHER PUBLICATIONS

Marchon et al., "Head-Disk Interface Materials Issues in Heat-Assisted Magnetic Recording", IEEE Transactions on Magnetics, vol. 50, No. 3, Mar. 2014.

(Continued)

*Primary Examiner* — Holly C Rickman
(74) *Attorney, Agent, or Firm* — Thomas R. Berthold

(57) ABSTRACT

A heat-assisted magnetic recording (HAMR) medium has a non-magnetic multilayered overcoat on the recording layer. The overcoat includes a heat-dissipation layer, a diamond-like carbon (DLC) layer on and in contact with the heat-dissipation layer, and an optional interface layer between and in contact with the recording layer and the heat-dissipation layer. The heat-dissipation layer is a material with relatively high in-plane thermal conductivity, substantially higher than the in-plane thermal conductivity of both the DLC layer and the recording layer. The heat-dissipation layer laterally spreads the heat generated in the DLC layer by absorption of light from the near-field transducer to thereby reduce the temperature of the DLC layer. The optional interface layer is a material with relatively low thermal conductivity and increases the thermal resistance between the recording layer and the heat-dissipation layer.

16 Claims, 5 Drawing Sheets

(56) References Cited

U.S. PATENT DOCUMENTS

| | | | | |
|---|---|---|---|---|
| 2015/0213825 A1* | 7/2015 | Sato | ......................... | G11B 5/72 |
| | | | | 428/833.1 |
| 2016/0118071 A1* | 4/2016 | Hirotsune | ................ | G11B 5/65 |
| | | | | 360/75 |
| 2018/0005658 A1 | 1/2018 | Zhang et al. | | |

OTHER PUBLICATIONS

Kiely et al., "Write-Induced Head Contamination in Heat-Assisted Magnetic Recording", IEEE Transactions on Magnetics, vol. 53, No. 2, Feb. 2017.
Slack et al., "Anisotropic Thermal Conductivity of Pyrolytic Graphite", Physical Review vol. 127, No. 3 Aug. 1, 1962.
Schmidt et al., "Characterization of thin metal films via frequency-domain thermoreflectance", Journal of Applied Physics 107, 024908 (2010).
Panthem et al., "Carbon Overcoat Oxidation in Heat-Assisted Magnetic Recording", IEEE Transactions on Magnetics, vol. 49, No. 7, Jul. 2013.
Gall, "Electron mean free path in elemental metals", Journal of Applied Physics 119, 085101 (2016).
Jones et al., "Temperature-Induced Changes in the Optical and Material Characteristics of HAMR Media COC and Its Effect on Recording Performance", IEEE Transactions on Magnetics, vol. 54, No. 2, Feb. 2018 3200104.
Yu et al., "Evaluation of thermal performance of graphene overcoat on multi-layered structure subject to laser heating", International Communications in Heat and Mass Transfer 68 (2015) 27-31.

\* cited by examiner

HEAT-ASSISTED MAGNETIC RECORDING (HAMR) MEDIUM WITH MULTILAYERED OVERCOAT

BACKGROUND

Field of the Invention

This invention relates generally to a perpendicular heat-assisted magnetic recording (HAMR) medium, and more particularly to a HAMR medium with an improved protective overcoat for the recording layer.

Description of the Related Art

In conventional granular magnetic recording media, the magnetic recording layer is a layer of granular magnetic material over the entire surface of the disk substrate. In magnetic recording disk drives the magnetic material for the recording layer is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, magnetic material with high magneto-crystalline anisotropy ($K_u$) is required. The thermal stability of a magnetic grain is to a large extent determined by $K_u V$, where V is the volume of the magnetic grain. Thus a recording layer with a high $K_u$ is important for thermal stability. However, increasing $K_u$ also increases the coercivity of the recording layer, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the air-bearing surface (ABS) of the air-bearing slider that also supports the read/write head and rides or "flies" above the disk surface.

One type of proposed high-$K_u$ HAMR media with perpendicular magnetic anisotropy is an alloy of FePt (or CoPt) alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt alloy magnetic layer also typically includes a segregant like C, $SiO_2$, $TiO_2$, $TaO_x$, $ZrO_2$, SiC, SiN, TiC, TiN, B, BC or BN that forms between the FePt grains and reduces the grain size. The FePt alloy requires deposition at high temperature (e.g., about 500 to 700° C.) or subsequent high-temperature annealing to achieve the desired chemical ordering to the $L1_0$ phase. A MgO underlayer is used as a seed layer to induce the desirable (001) texture to the FePt magnetic grains and influence their geometrical microstructure and to also act as a thermal barrier layer so that heat from the NFT is not dissipated too rapidly from the FePt recording layer.

A protective overcoat, typically a diamond-like carbon (DLC) layer, is formed over the FePt recording layer, and a liquid lubricant, like a perfluropolyether (PFPE), is bonded to the protective overcoat. The protective overcoat prevents corrosion of the media and protects the FePt recording layer from damage due to contact by the air-bearing slider.

SUMMARY

In HAMR the recording layer is heated above its Curie temperature ($T_a$), which for a FePt recording layer is about 700 K. However, the maximum temperature in the recording layer reaches even higher values, about 800-900 K, during the write process. As a result, the temperature in the DLC overcoat also reaches temperatures above 700 K. This is problematic because it is known that the DLC can degrade at these temperatures. It is also known that material can build up between the air-bearing slider and the disk at these temperatures, which can adversely affect the reading and writing of data. Thus it is desirable to reduce the temperature of the DLC overcoat without significantly reducing the temperature of the recording layer.

Additionally, the temperature rise in the recording layer needs to be local and with a large gradient (i.e., a rapid drop in temperature below $T_c$) enable high-density magnetic recording. A large along-the-track thermal gradient results in narrow bit transitions and thus allows data to be written at high linear density. A large cross-track thermal gradient allows writing data on one track without altering the data already written on neighboring tracks, which enables the data tracks to be positioned close together. Thus any reduction in temperature of the DLC overcoat should not significantly reduce the thermal gradient.

In embodiments of this invention the HAMR medium includes a non-magnetic multilayered overcoat on the recording layer. The overcoat comprises a heat-dissipation layer with relatively high thermal conductivity, a DLC layer on and in contact with the heat-dissipation layer, and an optional interface layer with relatively low thermal conductivity between and in contact with the recording layer and the heat-dissipation layer. The heat-dissipation layer is a material with relatively high in-plane thermal conductivity, substantially higher than the in-plane thermal conductivity of both the DLC layer and the recording layer. The heat-dissipation layer laterally spreads the heat generated in the DLC layer by absorption of light from the NFT to thereby reduce the temperature of the DLC layer. The optional interface layer is a material with high thermal resistance (relatively low thermal conductivity). The interface layer preferably has an in-plane thermal conductivity less than the in-plane thermal conductivity of the heat-dissipation layer. The interface layer increases the thermal resistance between the recording layer and the heat-dissipation layer.

For a fuller understanding of the nature and advantages of the present invention, reference should be made to the following detailed description taken together with the accompanying figures.

DETAILED DESCRIPTION

Figure 1:
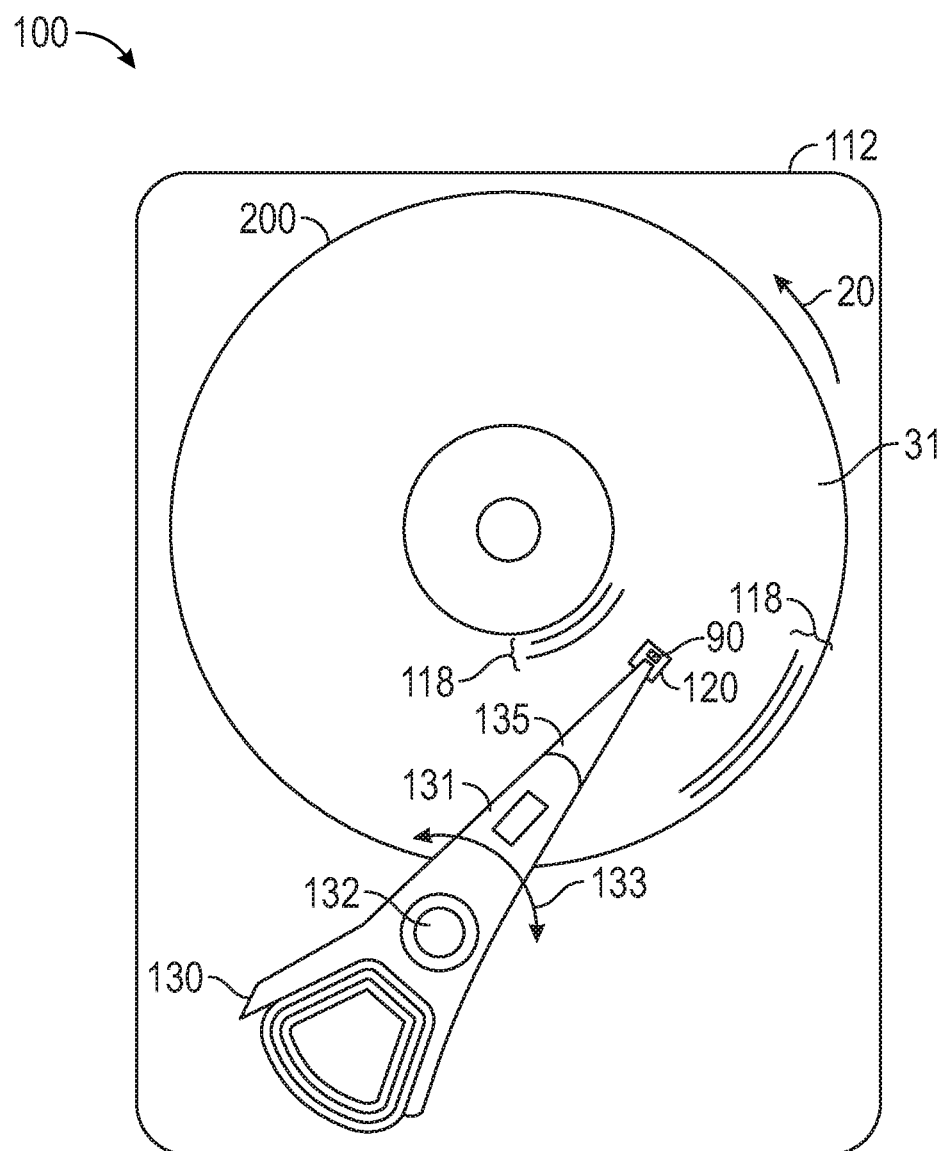
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
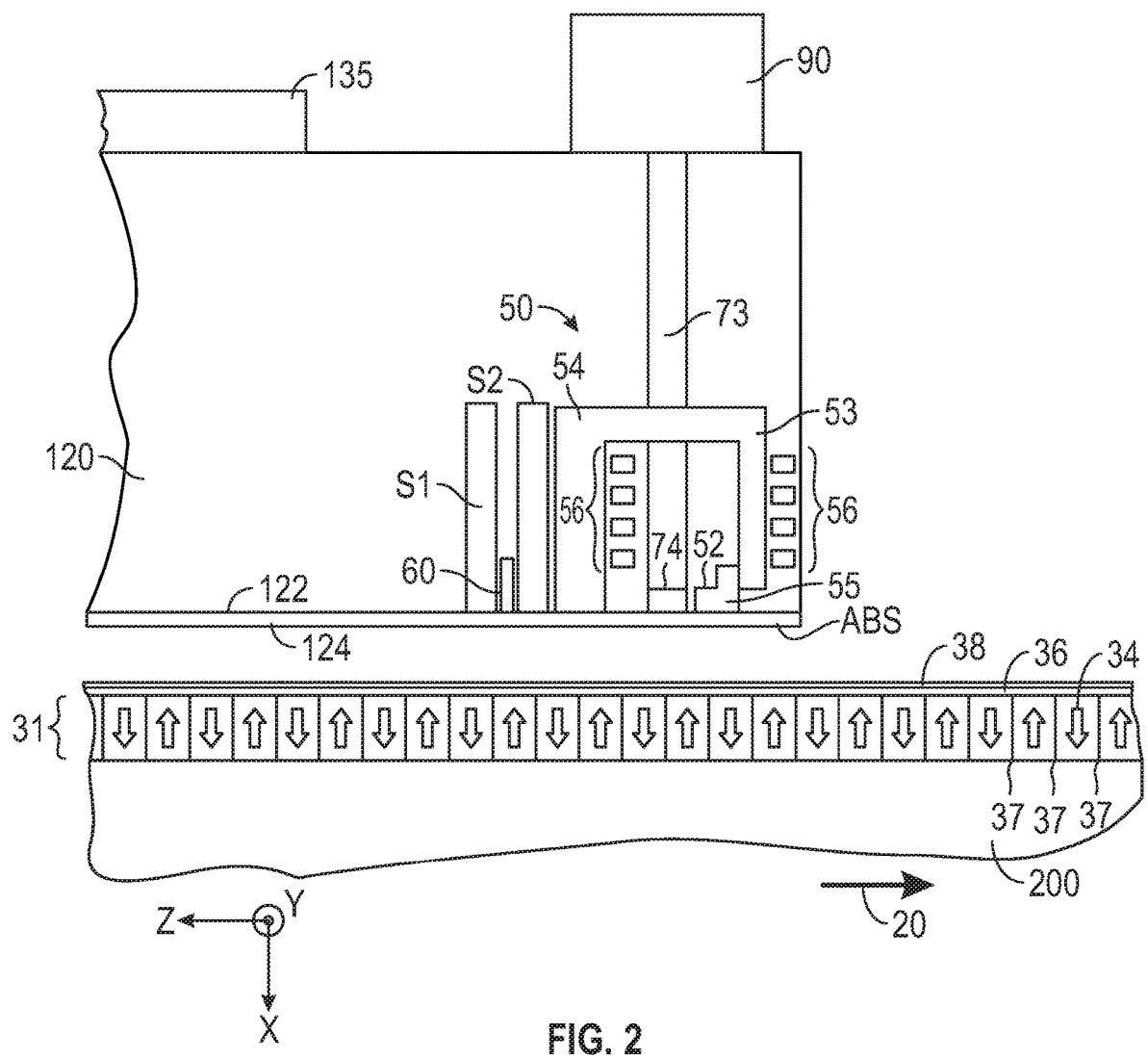
FIG. 2 depicts a sectional view, not drawn to scale because of the difficulty in showing the very small features, of an air-bearing slider for use in HAMR disk drive and a portion of a HAMR disk according to the prior.

FIG. 2 is a schematic cross-sectional view illustrating an example of a HAMR head according to the prior art, which is also capable of functioning as the HAMR head in embodiments of this invention. In FIG. 2, the X direction denotes a direction perpendicular to the air-bearing surface (ABS) of the slider, the Y direction denotes a track width or cross-track direction, and the Z direction denotes an along-the-track direction. The disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluropolyether (PFPE).

The air-bearing slider 120 is supported by suspension 135. The slider 120 has a recording-layer-facing surface 122 onto which an overcoat 124 is deposited. The overcoat 124 is typically a DLC overcoat with a thickness in the range of about 1 to 3 nm and whose outer surface forms the ABS of the slider 120. An optional adhesion film or undercoat (not shown), such as a 1 to 5 Å silicon nitride ($SiN_x$) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider ABS when light from the waveguide 73 is incident. Oscillating tip charge creates an intense near-field pattern, heating the recording layer 31. Sometimes, the metal structure of the NFT 74 can create resonant charge motion (surface plasmons) to further increase intensity and heating of the recording layer. At the moment of recording, the recording layer 31 of disk 200 is heated by the optical near-field generated by the NFT 74 at the same time a region or "bit" 34 is magnetized by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO-N_y$ as the core material. Alternatively, $SiO_2$ may be used as the cladding material and $Ta_2O_5$, $TiO_2$, $SiO-N_y$, or Ge-doped $SiO_2$ as the core material. The waveguide 73 that delivers light to NFT 74 is preferably a single-mode waveguide.

Figure 3:
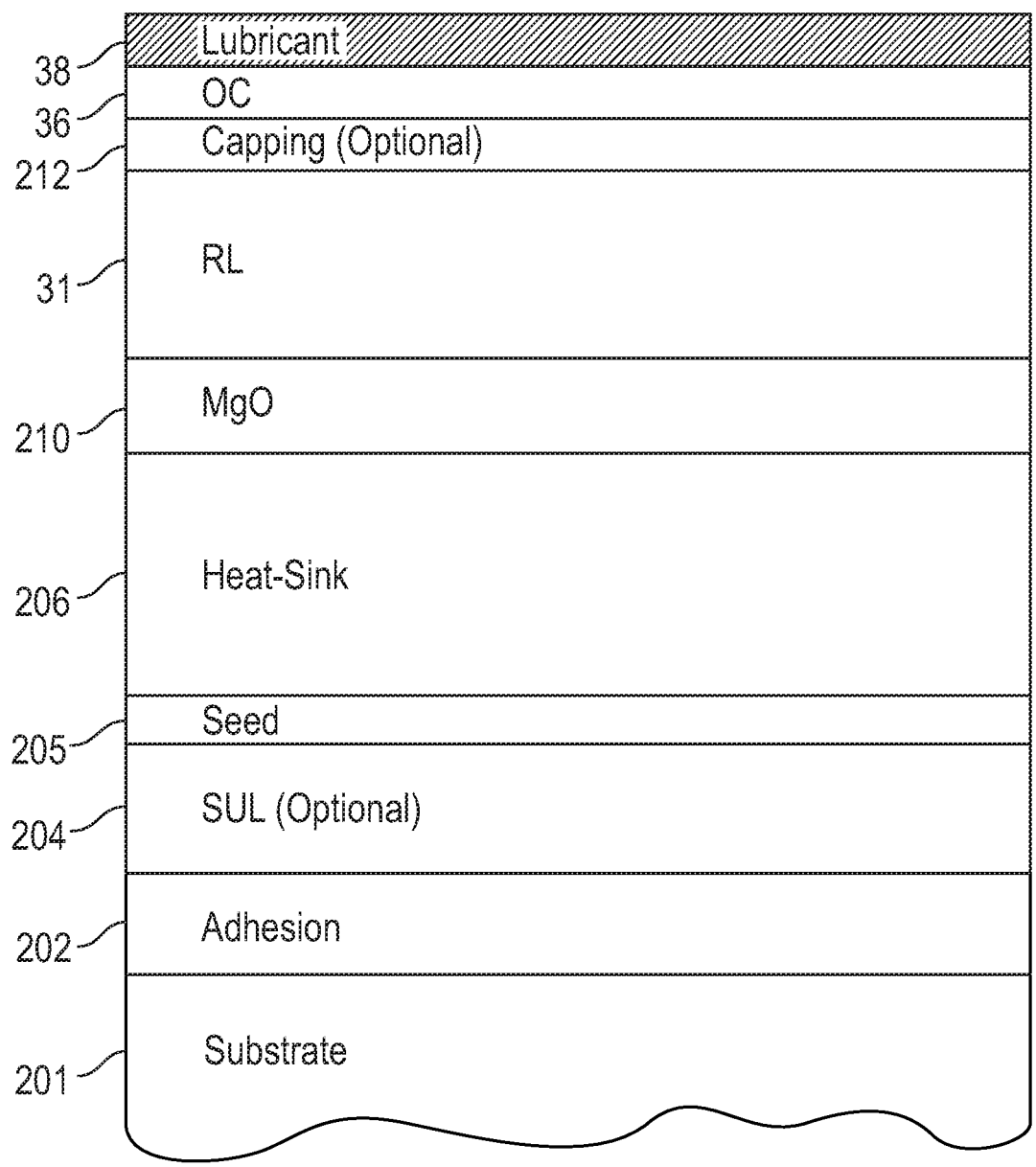
FIG. 3 is a sectional view showing a HAMR disk according to the prior art.

FIG. 3 is a sectional view showing HAMR disk 200 with a continuous granular recording layer (RL) 31 according to the prior art. The recording layer 31 may be comprised of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 202, typically about 10-200 nm of an amorphous adhesion layer material like a CrTa or NiTa alloy, is deposited on substrate 201.

An optional soft underlayer (SUL) 204 of magnetically permeable material that serves as a flux return path for the magnetic flux from the write head may be formed on the adhesion layer 202. The SUL 204 may be formed of magnetically permeable materials that are also compatible with the high-temperature deposition process for FePt, such as certain alloys of CoFeZr and CoZr. The SUL 204 may also be a laminated or multilayered SUL formed of multiple soft magnetic films separated by non-magnetic films, such as electrically conductive films of Al or CoCr. The SUL 204 may also be a laminated or multilayered SUL formed of multiple soft magnetic films separated by interlayer films that mediate an antiferromagnetic coupling, such as Ru, Ir, or Cr or alloys thereof. The SUL 204 may have a thickness in the range of about 5 to 100 nm.

A seed layer 205, for example a layer of RuAl or NiAl, is deposited on SUL 204, or on adhesion layer 202 if no SUL is used. A heat-sink layer 206 is then deposited on seed layer 205. The heat-sink layer 206 facilitates the transfer of heat away from the RL 31 to prevent spreading of heat to regions of the RL adjacent to where data is desired to be written, thus preventing overwriting of data in adjacent data tracks. The heat sink layer 206 may be formed of a material with high thermal conductivity, like Cu, Au, Ag, Cr, Mo or W or other suitable metals or metal alloys, with a typical thickness in the range of about 5 to 200 nm.

A layer 210 of MgO is formed on the heat-sink layer 206 and acts as both the seed layer for the RL 31 and a thermal barrier layer.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. The RL 31 may also be a pseudo-binary CoPt—X alloy based on the CoPt $L1_0$ phase.

FePt $L1_0$ phase based granular thin films exhibit strong perpendicular anisotropy, which potentially leads to small thermally stable grains for ultrahigh density magnetic recording. To fabricate small grain FePt $L1_0$ media some form of segregant to separate grains can be used as an integral part of the magnetic recording layer. Thus the RL 31 also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. While FIG. 3 depicts the RL 31 as a single magnetic layer, the recording layer may be a multilayer, for example multiple stacked FePt sublayers, each with a different segregant, as described in U.S. Pat. No. 9,406,329 B1 which is assigned to the same assignee as this application.

The FePt RL is sputter deposited, typically to a thickness of between about 4 to 15 nm, while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets.

An optional ferromagnetic capping layer 212, such as a thin film of Co, Fe or alloys of Co and Fe, may be formed on the RL 31, as shown in FIG. 3, in which case the capping layer forms the upper part of the RL. A protective overcoat (OC) 36 is deposited on the RL 31 (or on the optional capping layer 212), typically to a thickness between about 1 to 5 nm. OC 36 is preferably a layer of amorphous diamond-like carbon (DLC). The DLC may also be hydrogenated and/or nitrogenated, as is well-known in the art. On the completed disk, a liquid lubricant 38, like a perfluoropolyether (PFPE), is coated on OC 36.

HAMR is based on locally heating the RL above its Curie temperature, which is about 700 K for FePt. However, the maximum temperature in the RL reaches even higher values, about 800-900 K, during the write process. As a result, the temperature in the DLC overcoat also reaches temperatures above 700 K. This is problematic because it is known that the DLC can degrade at these temperatures, as described by Marchon et al., "Head-Disk Interface Materials Issues in Heat-Assisted Magnetic Recording", *IEEE Transactions on Magnetics*, vol. 50, pp. 137-143, 2014. It is also known that material can build up between the head and the disk at these temperatures, as described by Kiely et al., "Write-Induced Head Contamination in Heat-Assisted Magnetic Recording", *IEEE Transactions on Magnetics*, vol. 53, pp. 1-7, 2017.

Figure 4:
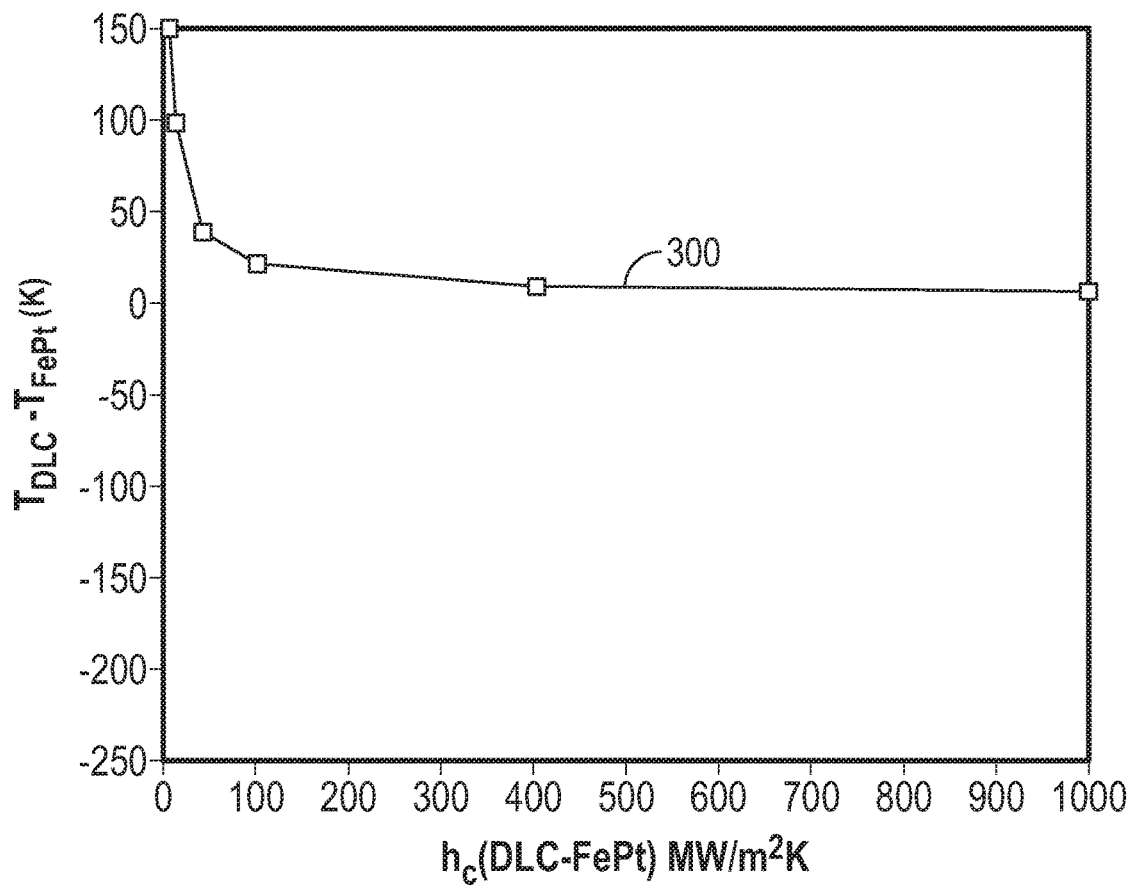
FIG. 4 is a graph of computer-simulated data showing the temperature difference between the DLC overcoat and the FePt magnetic layer as a function of values of thermal contact coefficient, $h_c$.

Thus it is necessary to reduce the temperature of the overcoat without reducing the temperature of the RL required during the write process. However, the reduction in overcoat temperature must not significantly lower the thermal gradient. A factor that affects the temperature of the overcoat is the thermal contact conductance between the FePt magnetic layer and the DLC overcoat. The thermal contact coefficient, $h_c$, is a property indicating the thermal conductivity, or ability to conduct heat, between two bodies in contact. The value of $h_c$ for FePt and DLC is difficult to measure or calculate, but is estimated to be around 400 $MW/m^2K$. FIG. 4 is a graph of computer-simulated data showing the temperature difference (line 300) between the DLC overcoat and the FePt magnetic layer as a function of values of $h_c$. In this example the DLC overcoat has an isotropic thermal conductivity (TC) (i.e., its in-plane thermal conductivity $TC_{IP}$ equals its out-of-plane thermal conductivity $TC_{OP}$) of about 1.3 W/mK. At low values of $h_c$ (very low thermal contact conductance or high thermal contact resistance), the DLC overcoat has a much higher temperature than the FePt magnetic layer. However, at $h_c$ values greater than about 100 MW/m²K, the temperature difference is relatively constant but the temperature of the DLC overcoat is still higher than the temperature of the FePt layer.

In embodiments of this invention the HAMR medium includes a non-magnetic multilayered overcoat. The overcoat comprises a heat-dissipation layer with relatively high thermal conductivity, a DLC layer on and in contact with the heat-dissipation layer, and an optional interface layer with relatively low thermal conductivity between and in contact with the recording layer and the heat-dissipation layer.

Figure 5:
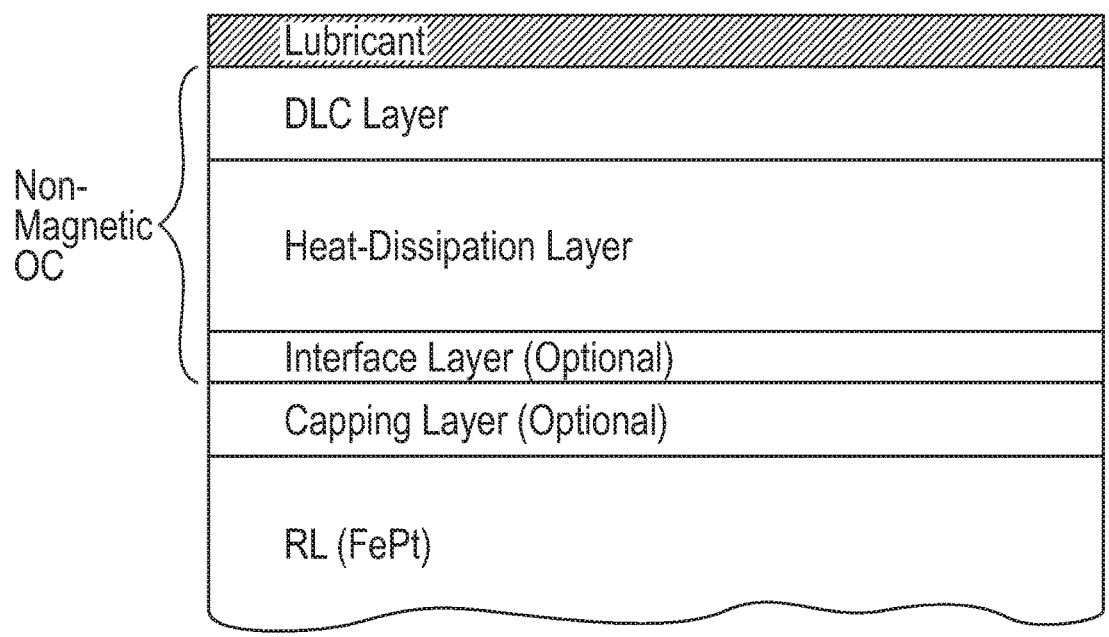
FIG. 5 is a sectional view showing a portion of a HAMR disk according to an embodiment of the invention with the non-magnetic multilayered overcoat.

FIG. 5 is a sectional view showing a portion of a HAMR disk according to an embodiment of the invention with the non-magnetic multilayered overcoat (OC). The OC has a total thickness of between about 3 to 6 nm. This relatively thin non-magnetic OC above the RL assures that there is an adequate readback signal from the RL. The DLC layer should have a thickness of at least 2 nm. The heat-dissipation layer may have a thickness between about 1 to 4 nm. The optional interface layer may have a thickness of at least 1 nm. As in the prior art HAMR disk a liquid lubricant, like a perfluorpolyether (PFPE), is coated on the DLC layer. The multilayered OC is formed directly on the RL, which is typically a substantially chemically-ordered FePt alloy or alternatively a substantially chemically-ordered CoPt alloy, a pseudo-binary FePt alloy or a pseudo-binary CoPt alloy. If the optional ferromagnetic capping layer, which is typically a thin film of Co, Fe or alloys of Co and Fe, is present, then the capping layer forms part of the RL.

The heat-dissipation layer is a material with relatively high $TC_{IP}$, i.e., preferably at least 5 W/mK, which is substantially higher than the $TC_{IP}$ of both DLC and FePt. The isotropic TC of DLC is about 1.3 W/mK. The $TC_{IP}$ of FePt thin films with segregants is less than 1 W/mK. The heat-dissipation layer has high $TC_{IP}$ to laterally spread the heat generated in the DLC layer by absorption of light from the NFT to thereby reduce the temperature of the DLC layer. Preferred materials for the heat-dissipation layer include metals, like Au, Cu and Ag, and alloys of those metals. There is an expected reduction of thermal conductivity with film thickness due to finite size effects. The actual thermal conductivity of a thin film depends on the electron mean free path, film thickness, and film grain size. For example, Au has an isotropic TC of about 320 W/mK. Theoretical estimates of TC for Au are about 30 W/mK at 1 nm film thickness and about 100 W/mK at 5 nm film thickness, as described by Schmidt et al., "Characterization of thin metal films via frequency-domain thermoreflectance", JOURNAL OF APPLIED PHYSICS 107, 024908 (2010). So thin films of Au will typically have a $TC_{IP}$ of at least 30 W/mK, which is substantially higher than the $TC_{IP}$ of both DLC and FePt. The heat-dissipation layer materials may also include metal alloys, for example AuNi and AuRh alloys with low amounts (less than about 5 atomic percent) of the added material. Other preferred materials include Rh and Ir, and their alloys, which have small bulk thermal resistivity and small electron mean free paths. Therefore, thin films of those materials in the nanometer range will retain reasonable thermal conductivities. (Gall et al., "Electron mean free path of elemental metals", JOURNAL OF APPLIED PHYSICS 119, 085101 (2016)).

Another suitable material for the heat-dissipation layer is hexagonal graphite, which is known to have anisotropic thermal conductivity, i.e., its $TC_{IP}$ is significantly greater than its $TC_{OP}$. Hexagonal graphite has a two-dimensional layered, planar structure. The individual layers are called graphene. In each graphite layer, the carbon atoms are arranged in a honeycomb lattice with separation of 0.142 nm, and the distance between planes is 0.335 nm. Hexagonal graphite is the three-dimensional version of graphene, corresponding to multiple planes of hexagonal carbon chains with the same basal plane structure as graphene. Pyrolitic graphite is hexagonal graphite with a high degree of preferred crystallographic orientation of the c-axes, substantially perpendicular to the surface of the substrate, and can be obtained by chemical vapor deposition (CVD) at temperatures above 1830° C. Hexagonal graphite has $TC_{IP}$ values of up to 2000 W/mK. Lower values have been reported, depending on film quality. The $TC_{IP}$ range for hexagonal graphite is between about 100 to 2000 W/mK, with ratios of $TC_{IP}/TC_{OP}$ reported of 50 to 500. (Slack, PHYSICAL REVIEW, VOL 127, NUMBER 3, Aug. 1, 1962). Hexagonal graphite may be deposited by CVD, plasma-enhanced CVD and pulse-laser deposition techniques.

The optional interface layer is a material with high thermal resistance (relatively low TC). The purpose of the interface layer is to increase the thermal resistance between the RL and the OC. The interface layer should have high thermal contact resistance (low thermal contact conductance coefficient 10 with the RL and/or with the heat-dissipation layer with which it is in contact. The interface layer preferably has a $TC_{IP}$ less than the $TC_{IP}$ of the heat-dissipation layer. Suitable materials for the interface layer include DLC, oxides like MgO, and nitrides like TiN.

Figure 6:
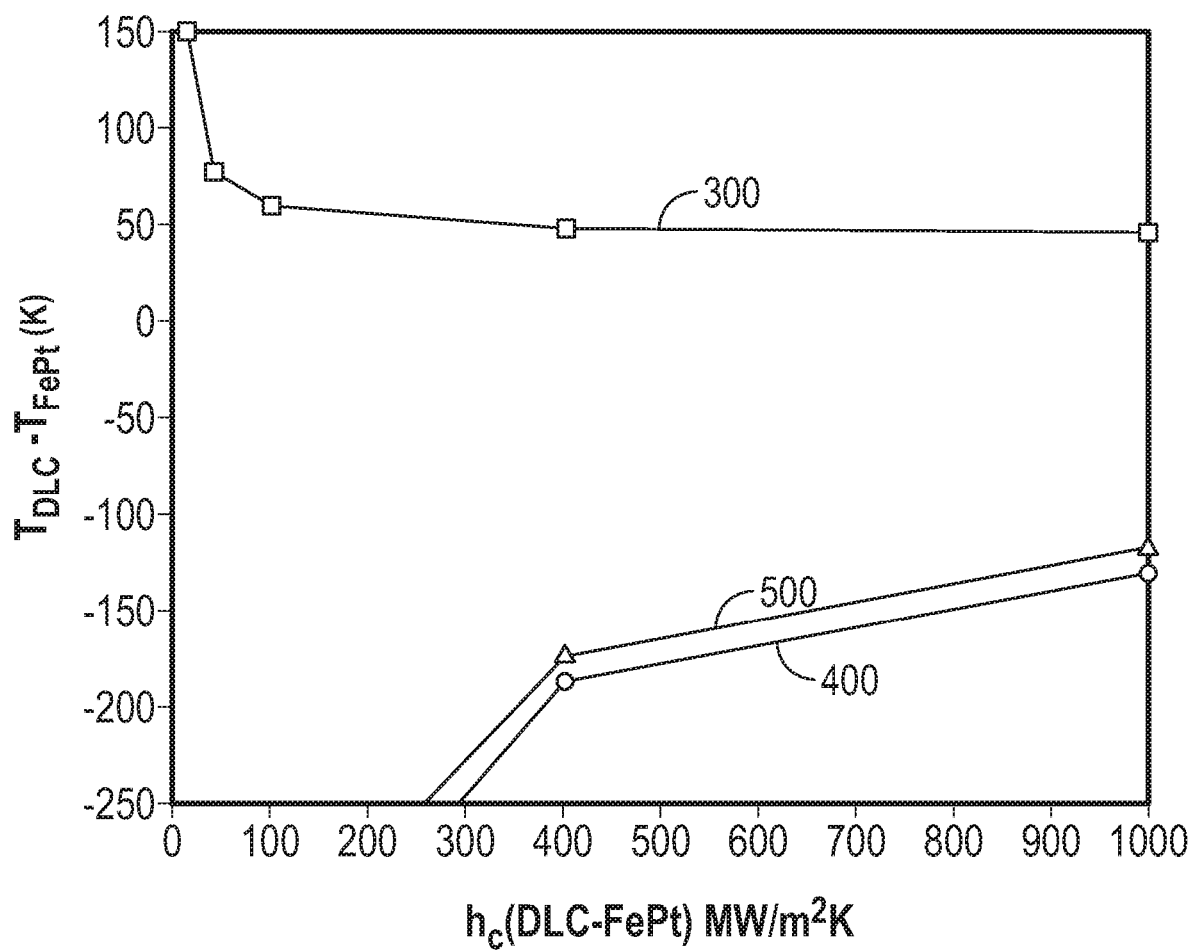
FIG. 6 is a graph of computer-simulated data comparing the temperature difference between the DLC of the non-magnetic multilayered overcoats and the FePt magnetic layer with the temperature difference between the prior art DLC overcoat and the FePt magnetic layer as a function of values of thermal contact coefficient, $h_c$.

FIG. 6 is a graph of computer-simulated data comparing the temperature difference between the DLC of the non-magnetic multilayered overcoats and the FePt magnetic layer with the temperature difference between the prior art DLC overcoat and the FePt magnetic layer as a function of values of $h_c$. Line 300 represents the temperature difference between the conventional DLC overcoat (with $TC_{IP}=1.3$ W/mK) and the FePt RL. Line 400 represents the temperature difference between the DLC layer of a multilayered overcoat of 2 nmAu/3 nmDLC (with $TC_{IP}=20$ W/mK) and the FePt RL. Line 500 represents the temperature difference between the DLC layer of a multilayered overcoat with the optional interface layer of 1 nm/MgO/2 nmAu/3 nmDLC (with $TC_{IP}=20$ W/mK) and the FePt RL. FIG. 6 thus shows that the non-magnetic multilayered overcoats reduce the temperature of the DLC below that of the FePt by about 200 K at h, of about 400 MW/m²K.

The computer modeling data also shows that the HAMR media with the multilayered overcoats of FIG. 6 also have improved thermal gradients, i.e., from about 11 to about 12.5 K/nm at $h_c$ of about 400 MW/m²K. This is believed due to the fact that heat-dissipation layers like Au improve the optical coupling between the NFT and the RL.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording medium comprising:
   a substrate;

a heat-sink layer on the substrate;
a magnetic recording layer comprising a substantially chemically-ordered alloy selected from a FePt alloy and a CoPt alloy on the heat-sink layer;
a multilayered non-magnetic overcoat comprising an interface layer selected from DLC, an oxide and a nitride on the recording layer, a heat-dissipation layer on and in contact with the interface layer, and a diamond-like carbon (DLC) layer on and in contact with the heat-dissipation layer, the heat-dissipation layer consisting essentially of one or more metals and their alloys and having an in-plane thermal conductivity greater than the in-plane thermal conductivity of DLC, and
wherein the interface layer has thermal conductivity less than the thermal conductivity of the heat-dissipation layer.

2. The medium of claim 1 wherein the heat-dissipation layer consists of a material selected from Cu, Au, Ag, Rh, Ir and their alloys.

3. The medium of claim 1 wherein the heat-dissipation layer consists of $AuRh_{(x)}$ or $AuNi_{(x)}$, wherein x is less than or equal to 5 atomic percent.

4. The medium of claim 1 wherein the in-plane thermal conductivity of the heat-dissipation layer is greater than the in-plane thermal conductivity of the recording layer.

5. The medium of claim 1 wherein the interface layer comprises a material selected from MgO and TiN.

6. The medium of claim 1 further comprising a lubricant on the DLC overcoat layer.

7. The medium of claim 1 wherein the recording layer comprises a ferromagnetic capping layer on the substantially chemically-ordered alloy.

8. The medium of claim 1 wherein the overcoat has a thickness greater than or equal to 2 nm and less than or equal to 6 nm.

9. A heat-assisted magnetic recording disk comprising:
a substrate;
a heat-sink layer on the substrate;
a magnetic recording layer comprising a substantially chemically-ordered alloy selected from a FePt alloy and a CoPt alloy on the heat-sink layer;
a multilayered non-magnetic overcoat comprising an interface layer selected from diamond-like carbon (DLC), an oxide and a nitride on the recording layer, a heat-dissipation layer on and in contact with the interface layer, and a DLC layer on and in contact with the heat-dissipation layer, the interface layer having thermal conductivity less than the thermal conductivity of the heat-dissipation layer and the heat-dissipation layer having an in-plane thermal conductivity greater than the in-plane thermal conductivity of DLC and greater than the in-plane thermal conductivity of the recording layer; and
a lubricant on the DLC overcoat layer.

10. The disk of claim 9 wherein the heat-dissipation layer comprises a material selected from Cu, Au, Ag, Rh, Ir and their alloys.

11. The disk of claim 9 wherein the recording layer comprises a ferromagnetic capping layer on the substantially chemically-ordered alloy.

12. A heat assisted magnetic recording (HAMR) disk drive comprising:
the disk according to claim 9; and
an air-bearing slider maintained near the magnetic recording layer of said disk and supporting a near-field transducer.

13. A heat-assisted magnetic recording medium comprising:
a substrate;
a heat-sink layer on the substrate;
a magnetic recording layer comprising a substantially chemically-ordered alloy selected from a FePt alloy and a CoPt alloy on the heat-sink layer; and
a multilayered non-magnetic overcoat comprising a heat-dissipation layer on the recording layer and a diamond-like carbon (DLC) layer on and in contact with the heat-dissipation layer, wherein the in-plane thermal conductivity of the heat-dissipation layer is greater than the thermal conductivity normal to the plane of the heat-dissipation layer and greater than the in-plane thermal conductivity of DLC.

14. The medium of claim 13 wherein the heat-dissipation layer comprises hexagonal graphite.

15. A heat assisted magnetic recording (HAMR) disk drive comprising:
the medium according to claim 13; and
an air-bearing slider maintained near the magnetic recording layer of said medium and supporting a near-field transducer.

16. A heat-assisted magnetic recording disk comprising:
a substrate;
a heat-sink layer on the substrate;
a magnetic recording layer comprising a substantially chemically-ordered alloy selected from a FePt alloy and a CoPt alloy on the heat-sink layer;
a multilayered non-magnetic overcoat comprising an interface layer on the recording layer, a heat-dissipation layer comprising hexagonal graphite on and in contact with the interface layer, and a diamond-like carbon (DLC) layer on and in contact with the heat-dissipation layer, the interface layer having thermal conductivity less than the thermal conductivity of the heat-dissipation layer and the heat-dissipation layer having an in-plane thermal conductivity greater than the in-plane thermal conductivity of DLC and greater than the in-plane thermal conductivity of the recording layer; and
a lubricant on the DLC overcoat layer.

* * * * *